March 24, 1959  D. DONALDSON  2,878,677
STATIC BALANCER FOR ROTATING PARTS
Filed Feb. 17, 1955  2 Sheets-Sheet 1
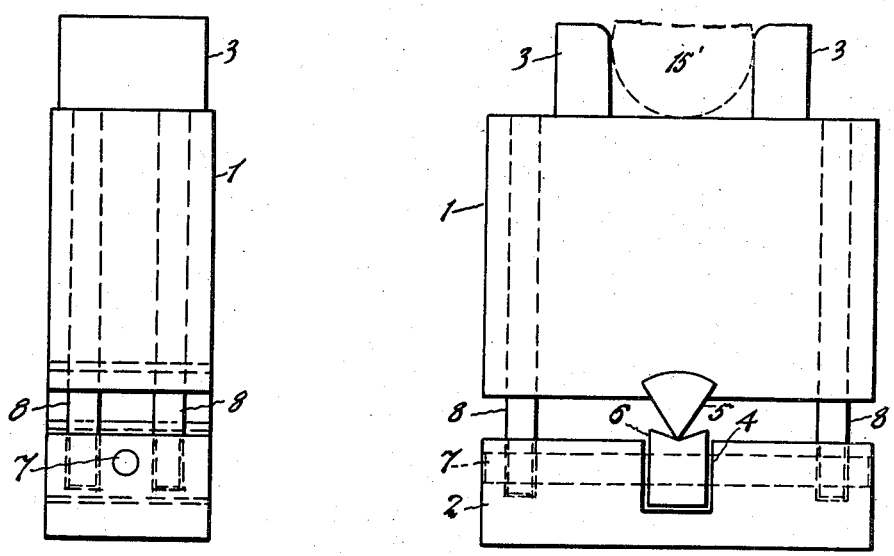
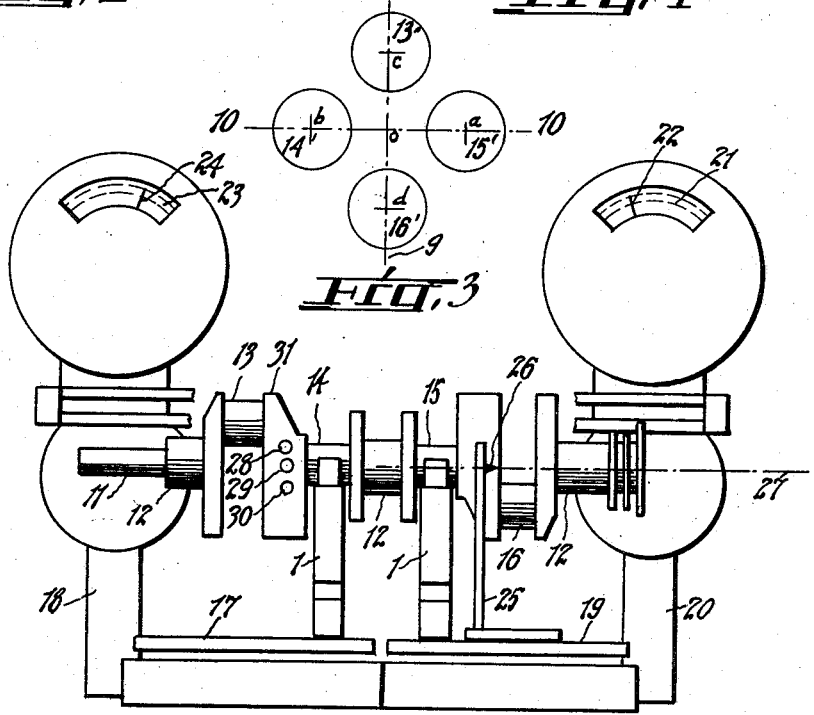
INVENTOR.
DAVID DONALDSON
BY Chas. Krasson
Attorney March 24, 1959 D. DONALDSON 2,878,677
STATIC BALANCER FOR ROTATING PARTS
Filed Feb. 17, 1955 2 Sheets-Sheet 2

INVENTOR.
DAVID DONALDSON
BY Chas. Krasnos
Attorney

United States Patent Office 2,878,677
Patented Mar. 24, 1959

2,878,677
STATIC BALANCER FOR ROTATING PARTS

David Donaldson, Windsor, Ontario, Canada

Application February 17, 1955, Serial No. 488,901

3 Claims. (Cl. 73—480)

This invention relates generally to machines used for balancing stationary parts which after being balanced are installed in machines or engines and function in use as rotating parts thereof, and particularly to a machine using a static balancing method for balancing such parts.

Rotating members of modern machines or engines, such as crankshafts, flywheels, etc., must be properly balanced in order to avoid objectionable and damaging vibrations and stresses. The centrifugal force resulting from an unbalanced condition increases to such a degree, due to the fact that the centrifugal force increases as the square of the speed, that considerable damage is done to the bearings and other related parts of the machine or engine in which the unbalanced member rotates.

Modern balancing machines use a dynamic method for balancing crankshafts, etc., i.e. the parts are balanced in the balancing machine while in rotation. Because of this method, a direct reading as to how much metal must be added or subtracted to provide proper balance, cannot be obtained. Instead, the moment of unbalance is converted to vibration by rotating the part in freely oscillating bearings; the amplitude of this vibration is converted to an electric voltage which when compared to a reference voltage provides a comparative reading, which in turn is converted to weight by experimentation. It is obvious that a very elaborate machine is required to perform all the above-mentioned steps in the balancing operation, and the sources for error are quite numerous.

It is the object of this invention to provide a balancing machine for statically balancing parts which are adapted to function in use as rotating members of a comparatively simplified form in which direct weight reading determines the balance to a high degree of accuracy.

This is accomplished in the invention by an arrangement of weighing apparatus which gives a direct corrective weight reading to the parts to be balanced, without rotation.

In describing the invention reference will be made to the attached drawings in which:

Figure 1 is a front elevation of a bracket used in supporting an item such as a crankshaft during the balancing operation.

Figure 2 is a side elevation of the above-mentioned bracket,

Figure 5:
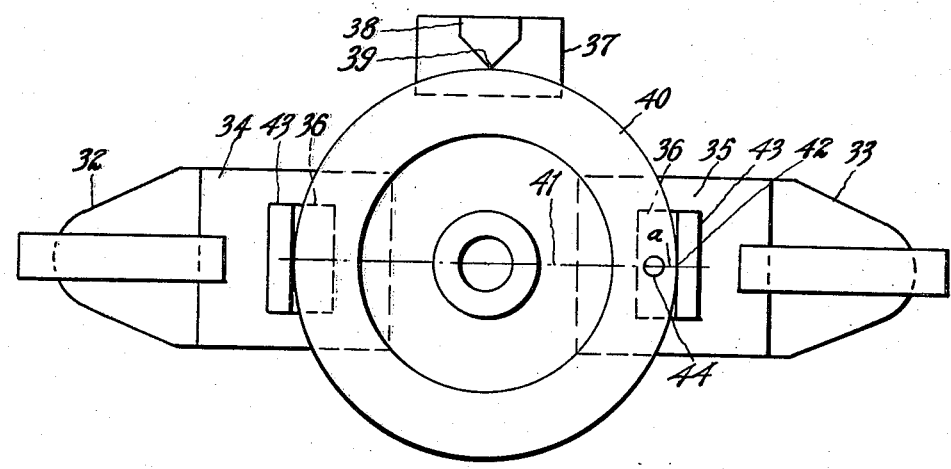
Figure 6:
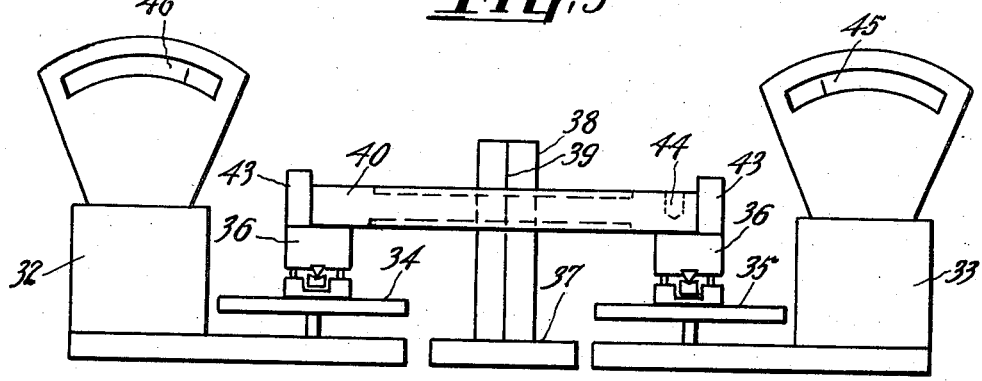
Figure 7:
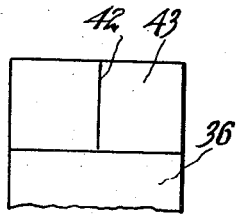

Figure 3 is a diagram illustrating the principle involved in the balancing operation, Figure 4 is a front elevation of the balancing apparatus, Figure 5 is a plan showing the arrangement of the apparatus required for balancing a part in the form of a circular disc, such as a flywheel, etc., Figure 6 shows a front elevation of the above-mentioned apparatus, and Figure 7 shows a variation in the construction of the bracket shown in Figures 1 and 2 to suit the requirements for balancing a part in the form of a circular disc.

In the drawings, Figures 1 to 4 show an arrangement for handling such items as crankshafts. A typical bracket for supporting a crankshaft consists of a rectangular metal block 1, preferably made of a high grade hard steel, provided at its top with two spaced stops 3, 3, which are spaced far enough apart to contain between them the connecting rod pin 15' of the crankshaft. The block 1 is further provided with longitudinal bores into which are inserted and slide fitted four rods 8. These rods are screwed into and held rigidly by a base plate 2. The base plate 2 has cut therein a centrally located rectangular groove 4 into which fits freely a V-notched narrow block 6 which is held in the groove 4 by means of a pin 7 which passes centrally through the plate 2 and the block 6, and allows the block 6 to pivot freely thereon. A replaceable knife edge 5 is centrally and rigidly located in the base of the block 1 so that the entire block rests by means of the said knife edge 5 on the block 6 and consequently on the base plate 2.

A crankshaft 11, which is used to demonstrate one of the balancing processes, requires four brackets of the type described above. For correct alignment these brackets should be machined in groups of four and kept to a high degree of tolerance. The most common type of crankshaft consists of centrally located journals 12 and offset crank pins 13, 14, 15, and 16, for connecting rods. A center line 27 passes through the journals 12. The crank pins 13, 14, 15, and 16 are radially disposed about the said center line so that one pair of pins such as 14 and 15 are at right angles to the other pair 13 and 16.

Other equipment for the balancing operation consists of a pair of similar scales 18 and 20 having a capacity of at least 25% more than the heaviest crankshaft to be balanced, and having a degree of sensitivity suitable for practical purposes. The scales 18 and 20 are provided with substantial platforms 17 and 19 respectively, upon which are rigidly attached the above mentioned brackets. Both scales with their dials facing the operator are arranged as shown in Figure 4. Scale 18 is provided with a calibrated scale 23 and an indicator arm 24, while the scale 20 has a similar calibrated scale 21 and an indicator arm 22. The scales must be perfectly aligned and securely mounted against movement. The brackets and scales are spaced apart to provide a perfect fit for the crankshafts to be belanced. That is, the scales are coaxially disposed in an end-to-end relationship longitudinally of the crankshaft to be weighed, as shown in Fig. 4, in such a position whereby the midpoint of the central journal 12 is disposed over the centerline between the adjacent ends of the scales, and, whereby, the appropriate pairs of brackets 1 for successively weighing the crankshaft along the axes 9—9 and 10—10, as illustrated in Fig. 3, are symmetrically mounted longitudinally of the crankshaft to successively support the crankshaft, first under the journals 14 and 15 and then under the journals 13 and 16. Furthermore, the brackets 1 will be laterally spaced apart so that the centerlines of the knife edge 5 on each bracket will be laterally disposed on opposite sides of the longitudial rotative centerline of the crankshaft, a distance equal to the arm lengths o—a and o—b, which are equal to each other, as shown by Fig. 3. The brackets are mounted on the scales so as to support the crankshaft in a level or horizontal position. Since the centers of the journals supported by the brackets are all disposed over the knife edges 5, as shown in Fig. 1, the symmetrically oppositely disposed journals 14 and 15, and, 13 and 16, may be successively mounted on brackets located as aforestated, and, the out of balance of the crankshaft on each side of the axes 9—9 and 10—10 may be accurately determined.

To balance a crankshaft, it is first placed into one pair of set up brackets so that each of one pair of crank pins rests in its own bracket as shown by 15' in Figure 1. The weight is read on each scale. The difference in weight between the scales indicates the weight of metal which must be removed or added to provide a balanced condition. The crankshaft is then removed from the brackets, turned 90°, and inserted in a similar manner in another pair of brackets spaced to fit the other pair of crank pins. The scales are read again and the difference in weight corrected for. For rapid operation each pair of brackets on its own pair of scales, would help considerably.

The usual means of balance correction on a crankshaft consists of removing excess weight rather than adding extra weight which would involve an elaborate process of welding. This is done by boring holes of known diameter to required depths in the weighted web 31 flanking each crank pin. Such holes must be bored either directly on the center line of the web and its crank pin, as shown by hole 29, or by an equal number of similar holes symmetrically spaced on either side of the said center line as shown by holes 28 and 30. In order to obtain the location of the said center line, a center gauge 25 is provided. When the crankshaft rests on each pair of brackets, the gauge which is perfectly adjusted to give the right center height from the platform surface, is moved along the web surface and a line is scratched by means of a scribe 26 attached to the gauge 25.

Figure 3 illustrates the theory upon which this method of balancing is based. The position of the crank pins 13, 14, 15, and 16, is shown by the circles 13', 14', 15', and 16' respectively. A plane 9—9 passes through the center of 13', the center of the crankshaft, and the center of 16'. A plane 10—10 passes through the center of 14', the center of the crankshaft, and the center of 15'. Since the opposite pairs of crank pins are at right angles to each other, the planes 9—9 and 10—10 are at right angles to each other. Whether the system is dynamic or static, in order to provide a balanced condition along the plane 10—10 the arm $o$—$a$ times the weight 15' must equal the arm $o$—$b$ times the weight 14', similarly, to have a balanced condition along the plane 9—9 the arm $o$—$c$ times the weight 13' has to equal the arm $o$—$d$ times the weight 16'. In a well manufactured crankshaft, it can be safely assumed that the distances $o$—$a$, $o$—$b$, $o$—$c$, and $o$—$d$ are equal in length for all practical purposes, and the only variables are the weights 13', 14', 15', and 16' which correspond to the crank pins 13, 14, 15, and 16, and their respective webs upon which the weight corrections are made.

In Figures 5, 6, and 7, is shown an arrangement of scales and brackets for balancing items having the shape of a circular disc such as fly wheels, etc.

In this arrangement, platform scales 32, and 33 having platforms 34 and 35, respectively, are located as shown in Figures 5 and 6. The brackets 36, 36, are fixed centrally upon the said platforms. Centrally between the brackets 36, 36, and in the rear of the scales 32, and 33, is located a stop which is rigidly fixed in the required position. This stop consists of a base 37, an upright bar 38, and a pointed edge 39 centrally located on the said bar 38.

The brackets 36, 36, are generally similar in construction to the bracket described and shown in Figures 1 and 2, except that they are modified on top to take a circular item such as shown by way of example by the wheel 40. This modification consists of a single stop bar 43 located on top of each of the brackets, and a center line 42 marked upon each of the stop bars 43.

The brackets 36, and the stop 37 are so located as to enable the placement of the wheel 40 so that a center line 41 of the said wheel coincides with the center marks 42 on the said brackets; the edge 39 is then in line with a center line through the wheel 40, at right angles to the centerline 41.

By way of illustrating the balancing process, let us assume that a greater weight was indicated by the scale 33 on its dial 45, than on the scale 32 by its dial 46. A mark "$a$" is scribed upon the surface of the wheel where it touches the line 42, and a hole 44 is drilled into the wheel until both scales indicate the same weight. Two holes symmetrically spaced about the mark "$a$" may be drilled instead of one hole, where a larger amount of metal has to be removed. The wheel 40 is then turned 90° so that the mark "$a$" is in line with the edge 39, and the weighing and drilling repeated as required. The wheel 40 is thus fully balanced.

It is important to stress the fact that all the involved equipment must be rigidly installed for continuous operation, and be perfectly aligned and level in order to produce satisfactory results, however, its simplicity of construction, operation, and reduced cost of maintenance, makes this a very economical balancing process.

Having described the invention what I claim is:

1. In a balancing construction for statically balancing stationary members adapted to function in use as rotating members including a pair of oppositely disposed platform scales, a first supporting bracket adapted to support one portion of a member on one of the scales, a second supporting bracket adapted to support another portion of a member on the other one of the scales, said brackets being located equidistant from the center of the member to be balanced, said brackets each comprising: a base plate adapted to be mounted on a platform scale, there being a rectangular groove in the upper surface of the base plate; a block provided with a V-groove on its upper side being pivotally mounted in said rectangular groove by means of a pin; a plurality of upwardly extending guide rods on said base plate; a rest block slidably mounted on said guide rods; a knife-edge centrally mounted on the lower end of said rest block and adapted to be operatively engaged in said V-groove in said first named block; and, locating means on the upper end of said rest block for locating one portion of a member supported by the rest block so as to have the centerline of said last named portion disposed in the vertical plane of the knife-edge to transmit the weight of said last named portion at a predetermined point on the scale.

2. The structure as defined in claim 1, wherein: said locating means comprises a pair of laterally spaced apart vertical bars and which are equidistant from the vertical plane through the knife-edge.

3. The structure as defined in claim 1, wherein: said locating means comprises a single bar provided with a locating mark on the vertical plane of the knife-edge.

References Cited in the file of this patent

UNITED STATES PATENTS

| | | |
|---|---|---|
| 1,610,718 | Thomas | Dec. 14, 1926 |
| 1,651,272 | Hapgood | Nov. 29, 1927 |
| 1,774,718 | McCabe | Sept. 2, 1930 |
| 2,282,052 | Hem | May 5, 1942 |
| 2,359,470 | Eddison | Oct. 3, 1944 |
| 2,576,468 | Martin | Nov. 27, 1951 |

FOREIGN PATENTS

| | | |
|---|---|---|
| 327,529 | Great Britain | Apr. 10, 1930 |